United States Patent
Smith et al.

(10) Patent No.: US 11,851,062 B2
(45) Date of Patent: Dec. 26, 2023

(54) PHYSICS-INFORMED OPTIMIZATION FOR AUTONOMOUS DRIVING SYSTEMS

(71) Applicant: Waymo LLC, Mountain View, CA (US)

(72) Inventors: David Smith, Sunnyvale, CA (US); Kevin Yoon, Oakland, CA (US)

(73) Assignee: Waymo LLC, Mountain View, CA (US)

( * ) Notice: Subject to any disclaimer, the term of this patent is extended or adjusted under 35 U.S.C. 154(b) by 126 days.

(21) Appl. No.: 17/116,314

(22) Filed: Dec. 9, 2020

(65) Prior Publication Data
US 2022/0176962 A1 Jun. 9, 2022

(51) Int. Cl.
*B60W 30/18* (2012.01)
*B60W 60/00* (2020.01)
*G01C 21/34* (2006.01)

(52) U.S. Cl.
CPC .... *B60W 30/18109* (2013.01); *B60W 60/001* (2020.02); *G01C 21/3461* (2013.01); *G01C 21/3492* (2013.01); *B60W 2510/18* (2013.01); *B60W 2710/18* (2013.01)

(58) Field of Classification Search
CPC ......... B60W 30/18109; B60W 60/001; B60W 2510/18; B60W 2710/18; G01C 21/3492
See application file for complete search history.

(56) References Cited

U.S. PATENT DOCUMENTS

| | | | | |
|---|---|---|---|---|
| 2014/0297182 | A1* | 10/2014 | Casson | G01C 21/28 701/537 |
| 2016/0313133 | A1* | 10/2016 | Zeng | B60W 60/0011 |
| 2017/0045137 | A1* | 2/2017 | Dufford | B60W 30/18136 |
| 2019/0294173 | A1* | 9/2019 | Szubbocsev | B60W 60/0023 |
| 2020/0139954 | A1* | 5/2020 | Wallstedt | B60W 10/18 |
| 2020/0141486 | A1* | 5/2020 | Hawley | B60W 30/18136 |
| 2021/0004004 | A1* | 1/2021 | Whitfield, Jr. | G05D 1/0282 |

* cited by examiner

*Primary Examiner* — Khoi H Tran
*Assistant Examiner* — Tristan J Greiner
(74) *Attorney, Agent, or Firm* — Lowenstein Sandler LLP (57) ABSTRACT

A method includes identifying, based on grade data of a route of an autonomous vehicle (AV), a segment of the route that has a grade value that meets a threshold grade value. Responsive to identifying the segment, the method further includes generating, based on the grade data and physical vehicle data of the AV, driving constraint data for the segment of the route. The method further includes causing a routing module of the AV to generate, based on the driving constraint data for the segment of the route, short time horizon routing data corresponding to a portion of the segment. The AV is to travel the portion of the segment of the route based on the short time horizon routing data.

20 Claims, 5 Drawing Sheets

PHYSICS-INFORMED OPTIMIZATION FOR AUTONOMOUS DRIVING SYSTEMS

TECHNICAL FIELD

The instant specification generally relates to autonomous vehicles. More specifically, the instant specification relates to implementing physics-informed optimization with respect to the autonomous vehicles.

BACKGROUND

An autonomous vehicle (AV) operates by sensing an outside environment with various sensors and charting a driving path through the environment based on the sensed data, Global Positioning System (GPS) data, and road map data. Among the autonomous vehicles are trucks used for long-distance load deliveries. Trucking industry is sensitive to various costs and, in particular, fuel costs. To improve fuel efficiency, human truck drivers use a variety of driving techniques, such as maintaining a constant speed whenever possible, accelerating through downhill sections of the road in order to acquire an additional momentum to carry the vehicle into subsequent uphill sections, and other techniques, which can be equally useful for autonomous vehicles. Successful implementation of such methods, however, can depend on the road conditions. Higher efficiency is usually achieved when traffic is light. Conversely, presence of a large number of other trucks, carrying different loads and moving with different speeds, as well as passenger cars, motorhomes, and other vehicles is often detrimental to driving performance. Challenging weather conditions can introduce further uncertainty and increase costs while negatively affecting expected delivery times.

BRIEF DESCRIPTION OF THE DRAWINGS

The disclosure is illustrated by way of examples, and not by way of limitation, and can be more fully understood with references to the following detailed description when considered in connection with the figures, in which.

SUMMARY

In one implementation, disclosed is a method including identifying, based on grade data of a route of an autonomous vehicle (AV), a segment of the route that has a grade value that meets a threshold grade value. Responsive to identifying the segment, the method further includes generating, based on the grade data and physical vehicle data of the AV, driving constraint data for the segment of the route. The method further includes causing a routing module of the AV to generate, based on the driving constraint data for the segment of the route, short time horizon routing data corresponding to a portion of the segment. The AV is to travel the portion of the segment of the route based on the short time horizon routing data.

In another implementation, disclosed is a system including a memory device and a processing device coupled to the memory device. The processing device is to identify, based on grade data of a route of an autonomous vehicle (AV), a segment of the route that has a grade value that meets a threshold grade value. Responsive to identifying the segment, the processing device is further to generate, based on the grade data and physical vehicle data of the AV, driving constraint data for the segment of the route. The processing device is further to cause a routing module of the AV to generate, based on the driving constraint data for the segment of the route, short time horizon routing data corresponding to a portion of the segment, wherein the AV is to travel the portion of the segment of the route based on the short time horizon routing data.

In another implementation, disclosed is a non-transitory computer-readable storage medium having instructions stored thereon that, when executed by a processing device, cause the processing device to identify, based on grade data of a route of an autonomous vehicle (AV), a segment of the route that has a grade value that meets a threshold grade value. Responsive to identifying the segment, the processing device is further to generate, based on the grade data and physical vehicle data of the AV, driving constraint data for the segment of the route. The processing device is further to cause a routing module of the AV to generate, based on the driving constraint data for the segment of the route, short time horizon routing data corresponding to a portion of the segment. The AV is to travel the portion of the segment of the route based on the short time horizon routing data.

DETAILED DESCRIPTION

A vehicle (e.g., truck) travels a route from a starting location to a destination location. Routes include segments that have different grades (e.g., elevations, pitches, uphill, downhill) of different lengths. Routes also include segments that have different radius of curvature (e.g., winding roads of different lengths and grades). Some route segments are associated with historical data, such as historically windy segments, historically high-traffic segments, historically recommended lanes in segments, etc.

An autonomous vehicle (AV) performs vehicle actions, such as braking, steering, and throttling, to move the AV from the starting location to the destination location along the route. The AV has a planning module that receives route data (e.g., from a server) that includes particular roads to travel from the starting location to the destination location. The planning module (also referred to herein as a "routing module") receives sensor data from the perception system (e.g., vehicle sensors) that indicates locations of other objects. The routing module uses the sensor data and the route data to generate short time horizon routing data. The short time horizon routing data includes instructions of how to control the AV over a short interval of time (e.g., the next 10 seconds). The short time horizon routing data may be generated (e.g., regenerated, refreshed) very frequently (e.g., every 100 milliseconds (ms)). By being generated very frequently, the short time horizon routing data can be responsive to changes in the vehicle or the world (e.g., engine degradation, other objects changing course or speed or appearing suddenly). The routing module provides the short time horizon routing data to the motion control module. The motion control module controls the vehicle systems over the next interval of time (e.g., the next 10 seconds, next 100 ms) based on the short time horizon plan data (e.g., and the refreshed or regenerated short time horizon plan). The routing module continues generating (e.g., refreshing) new short time horizon routing data for the subsequent intervals of time based on the route data and the current sensor data from the perception system. The motion control module continues controlling the vehicle based on the new short time horizon plan data.

Since the generation of the short time horizon routing data can be computationally-intensive (e.g., determining how to control the vehicle systems based on the sensor data and route data) and the short time horizon routing data has a quick refresh rate (e.g., generate new short time horizon routing data every 100 milliseconds), conventionally the routing module can only take into consideration the route data and the sensor data to generate short time horizon routing data over small intervals of time.

Some vehicle actions are appropriate over a shorter distance and are not appropriate over a longer distance. For example, for a short downhill grade that only lasts 10 seconds, a routing module of an AV may appropriately direct the motion control module to apply the friction brakes. In another example, for a longer downhill grade that is 10 miles (mi) long, a professional driver would account for the steepness of the grade and the length of the grade to determine strategy (e.g., downshifting, engine braking). A conventional routing module of an AV is typically only aware of the next short interval of time (e.g., next 10 seconds) and may inappropriately direct the motion control module to apply the friction brakes (e.g., instead of downshifting, engine brake, etc. that may be more appropriate for a longer downhill segment). The motion control module generally operates without context and executes the trajectories from the routing module. By only being aware of the next short interval of time, a conventional routing module may cause an AV to perform actions that negatively affect vehicle components (e.g., prematurely wear out the brake pads).

In another example, for a longer uphill grade where the regulatory speed limit is 65 miles per hour (mph), based on the total mass of an AV, the AV may only be able to travel at 50 mph. A conventional routing module may instruct the motion control module to drive at the regulatory speed limit. By instructing the motion control module to drive at a higher speed limit than the AV is capable of driving, accumulated error may occur (e.g., between where the routing module projects the AV will be and where the AV will actually be). In some instances, collisions may also occur (e.g., attempting to pass a vehicle at a regulatory speed limit that the AV is currently not capable of).

Aspects of the disclosure address the above challenges along with others, by generating physics-informed data (e.g., driving constraint data, type of braking for a segment of a route, calculated maximum speed for a route, etc.) for controlling of the AV.

In some implementations, a strategy module (e.g., located in a server or onboard the AV) identifies physical data. The physical data may include physical route information, such as length values of segments of the route and grade values of segments of the route. The physical data may also include physical vehicle data, such as at least one of total mass of the AV, braking capabilities of the AV, transmission gear ratios of the AV, wheelbase data of the AV, or engine capabilities of the AV.

The strategy module can use the physical data to generate physics-informed strategy data (also referred to herein as "physics-informed data" or "driving constraint data") for the segments of the route to be travelled by the AV. In some implementations, the strategy module applies rules to the physical data to generate the physics-informed strategy data. A rule may specify one or more conditions (e.g., based on one or more characteristics of a segment of a route and one or more characteristics of an AV) and one or more recommended AV actions to be performed (and/or recommended constraints on AV actions to be used) when the specified conditions are satisfied. In some examples, a first rule specifies that for a threshold downhill grade value (e.g., 2% downhill grade or greater) for a segment of a route, over a threshold distance value (e.g., at least 1 mile) of the segment of the route, with a threshold mass of the AV, and particular braking capabilities (e.g., engine brake and friction brake), an AV is to use a type of braking (e.g., engine braking) to decrease speed over the segment of the route. The strategy module can apply the first rule to the physical data for a first segment of a route which includes physical route data (e.g., grade value, distance value, etc.) for the first segment and physical vehicle data (e.g., total mass, braking capabilities, etc.) of the AV to determine that the AV is to use engine braking for the first segment of the route. By applying rules to physical data of each of the segments of the route, the strategy module can determine physics-informed strategy data (e.g., type of braking) for each of the segments of the route. The physics-informed strategy data can include recommended vehicle actions (and/or constraints on vehicle actions) for different segments of the route. Each segment of the route may have a substantially constant grade (e.g., first segment has a substantially 3% uphill grade over the length of the first segment, etc.).

In some implementations, the physics-informed strategy data includes a corresponding type of braking for a particular segment of the route. For example, for a segment that has a 10 mi downhill grade, the physics-informed strategy data may indicate to use downshifting and/or engine braking instead of friction braking for that segment to avoid prematurely wearing out the friction brakes.

In some implementations, the physics-informed strategy data includes a calculated maximum speed (e.g., that is lower than a maximum regulatory speed) for a segment of the route. For example, for a segment that has a 1 mi uphill grade that has a 65 mph regulatory maximum speed limit and a specific total mass of the AV, the physics-informed strategy data may indicate to use a calculated maximum speed limit of 50 mph to avoid accumulated errors and to avoid collisions.

The strategy module can cause the routing module to generate short time horizon routing data based on the physics-informed strategy data for the segments of the route (e.g., by providing the physics-informed strategy data to the routing module). For example, for a given segment, the physics-informed strategy data may indicate a calculated maximum speed and the routing module can generate the short time horizon routing data based on the calculated maximum speed (e.g., instead of the regulatory maximum speed). In some implementations, the strategy module causes the motion control module to control the actuators of the AV based on the physics-informed strategy data (e.g., use a specific gear ratio, use a specific braking system, etc.).

In some implementations, the strategy module identifies grade data of a route of an AV and physical vehicle data of the AV. The strategy module may determine, based on the grade data, segments of the route (e.g., each segment has a corresponding substantially constant grade). The strategy module identifies, based on the grade data, a segment of the route that has a grade value (e.g., steepness and/or length) that meets a threshold grade value (e.g., threshold steepness and/or length) and generates, based on the grade data and the physical vehicle data of the AV, driving constraint data (e.g., physics-informed strategy data) for the segment of the route. The strategy module causes a routing module of the AV to generate, based on the driving constraint data, short time horizon routing data corresponding to a portion (e.g., the next ten seconds) of the segment. The strategy module may cause a motion control module of the AV to control actuators of the AV (e.g., braking systems, transmission gears, etc.) based on the driving constraint data.

Aspects and implementations disclosed herein provide numerous advantages over existing technologies. By generating the short time horizon routing data based on the physics-informed strategy data for the segments of the route, the routing module sends instructions to the motion control module that generate less wear-and-tear on the AV, avoids collisions, avoids accumulation of error, is more fuel efficient, and/or the like. By generating the short time horizon routing data based on the physics-informed strategy data for the segments of the route, the routing module implements strategies that are beyond the short interval (e.g., 10 seconds) of the short time horizon plan without incurring additional processor overhead and slower refresh rate. By controlling the actuators based on the physics-informed strategy data, the motion control module implements physics-based strategies without incurring additional processor overhead.

Figure 1:
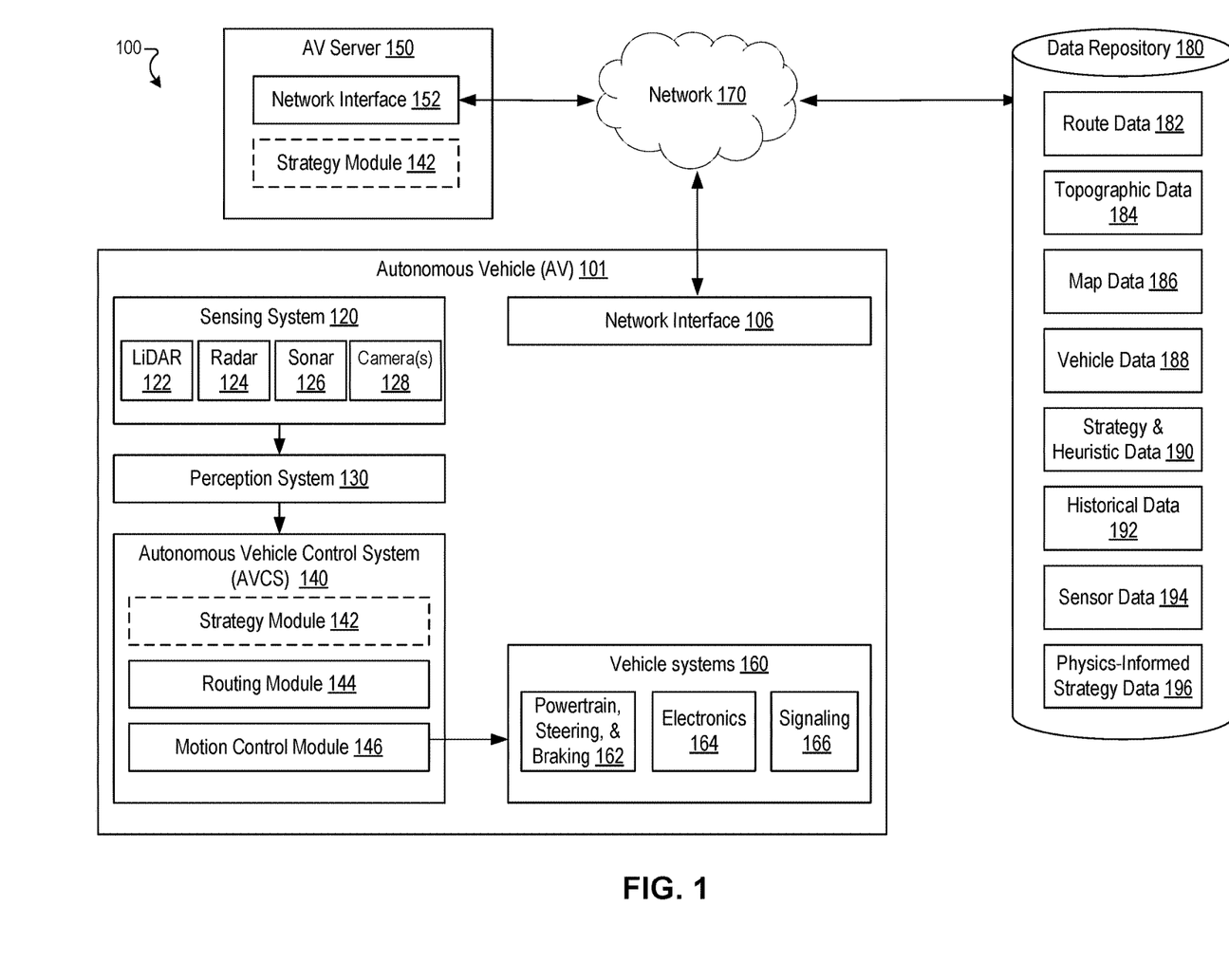
FIG. 1 is a diagram illustrating components of an example architecture of a system that provides physics-informed optimization for an autonomous vehicle (AV), in accordance with some implementations of the disclosure.

FIG. 1 is a diagram illustrating components of an example architecture 100 of a system that provides physics-informed optimization for an autonomous vehicle (AV) 101, in accordance with some implementations of the disclosure. Although alternatively referred to as "trucks," autonomous vehicles can include any motor vehicles, such as cars, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). Autonomous vehicles can include vehicles with various levels of autonomy, such as level 2 (partial autonomy) through level 5 (full autonomy). Autonomous vehicles can include vehicles using an internal combustion engine (e.g., gas engine, diesel engine, etc.), an electric engine (motor), or combination thereof (e.g., hybrid AV). AV 101 can be capable of traveling on paved and/or unpaved roadways, off-road, on various surfaces encountered on farming (or other agricultural) land, within a driving environment (including indoor environment) of an industrial plant, and so on.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nanometer (nm) wavelength range), the UV range (below 380 nm), the infrared range (above 400 nm), the radio frequency range (above 1 m), etc. In implementations, "optical" can include any other suitable range of the electromagnetic spectrum.

The sensing system 120 can include one or more LiDAR sensors 122 (e.g., a LiDAR rangefinders), which can be laser-based units capable of determining distances (e.g., using time-of-flight (ToF) technology) to the objects in the environment around AV 101. For example, LiDAR sensor(s) 122 can emit one or more laser signals (pulses) that travel to an object and then detect arrived signals reflected from the object. By determining a time delay between the signal emission and the arrival of the retro-reflected waves, a ToF LiDAR sensors 122 can determine the distance to the object. LiDAR sensor(s) 122 can emit signals in various directions to obtain a wide view of the outside environment. LiDAR sensor(s) 122 can utilize wavelengths of electromagnetic waves that are shorter than the wavelength of the radio waves and can, therefore, provide a higher spatial resolution and sensitivity compared with the radar unit 124. In some implementations, LiDAR sensor(s) 122 can be (or include) coherent LiDAR sensor(s), such as a frequency-modulated continuous-wave (FMCW) LiDAR sensor(s). FMCW LiDAR sensor(s) (or some other coherent LiDAR sensors) can use optical heterodyne detection for instant velocity determination. LiDAR sensor(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR sensor(s) 122. In some implementations, LiDAR sensor(s) 122 can ensure a 360-degree view in a horizontal direction and up to 90 degrees in the vertical direction.

The sensing system 120 can include one or more radar units 124, which can be any system that utilizes radio or microwave frequency signals to sense objects within the driving environment of the AV 101. The radar unit(s) 124 can be configured to sense both the spatial locations of the objects (including their spatial dimensions) and their velocities (e.g., using the Doppler shift technology), such as translational velocities and angular (rotational) velocities. Sensing system 120 can also include one or more sonars 126, which can be ultrasonic sonars, in some implementations.

Sensing system 120 can further include one or more cameras 128 to capture images of the driving environment. The images can be two-dimensional projections of the driving environment (or parts of the driving environment) onto a projecting plane (flat or non-flat, e.g. fisheye) of the cameras. Some of cameras 128 of sensing system 120 can be video cameras configured to capture a continuous (or quasi-continuous) stream of images of the driving environment.

The sensing data obtained by sensing system 120 can be processed by a perception system 130 that can be configured to detect and track objects in the driving environment and to identify the detected objects. For example, perception system 130 can analyze images captured by cameras 128 and can be capable of detecting traffic light signals, road signs, roadway layouts (e.g., boundaries of traffic lanes, topologies of intersections, designations of parking places, and so on), presence of obstacles, and the like. Perception system 130 can further receive the LiDAR sensing data (coherent Doppler data and incoherent ToF data) to determine distances to various objects in the environment and velocities of such objects. In some implementations, perception system 130 can use the LiDAR data in combination with the data captured by the camera(s) 128. In one example, the camera (s) 128 can detect an image of a rock partially obstructing a traffic lane. Using the data from the camera(s) 128, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another implementation, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

Perception system 130 can further receive information from a GPS transceiver (not shown) configured to obtain information about the position of the AV relative to Earth and use the GPS data in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some implementations, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

In some implementations, the perception system 130 can provide, generate, or be used to help generate sensor data 194 (e.g., environmental sensing data, scenario sensing data, GPS data, etc.) pertaining to a route of a vehicle. Herein "route" refers to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein refers to any portion of the overall driving task.

Route data 182 can include information about the starting point, intermediate points and destination point of the route (e.g., longitude and latitude information of points along the route) and include physical characteristics of various routes. "Trajectory" refers to driving settings, specified for various locations along the route, and includes speed, throttle, brake, etc. control that determine progression of the vehicle along the route. For example, a trajectory can include throttle settings, T(L) as a function of the location L along the route, target speed of the vehicle S(L), gear selection sequences, and so on. The location L can be identified by the distance travelled, GPS coordinates, road markers (e.g., mileposts), or a combination thereof, or in any other way.

Topographic data 184 can include information about the topography of the roads (e.g., grade and radius of curvature, pitch, elevation, etc.) or topography along the route.

Map data 186 can include information about the road network along the route, such as the quality of road surfaces, number of lanes, regulatory speed limits (e.g., regulatory maximum speed limits, regulatory minimum speed limits), type and number of exit ramps, availability of gas stations, and so on. Map data 186 can also include traffic data that includes information about historic traffic patterns or current traffic conditions along or near the route.

Vehicle data 188 can include data about the AV 101. Vehicle data 188 can be physical vehicle data, such as total mass of the AV 101, braking capabilities of the AV (e.g., regenerative braking, friction braking, engine braking, downshifting, exhaust braking, using drive line retarders, etc.), transmission gear ratios of the AV, wheelbase data of the AV, engine capabilities of the AV, lateral dynamics data (e.g., how the AV reacts to winding roads), etc.

Strategy and heuristic data 190 can include data related to best practices, such as professional driver strategies and heuristics. Strategy and heuristic data 190 can include data such as different types of braking that are appropriate for lengths of road segments at a particular grade (e.g., engine brake and/or downshifting at particular lengths of road with a particular downhill grade), gear ratios that are appropriate for lengths of road segments at a particular grade and speed, particular deceleration that is appropriate for radius of curvature of a road and grade (e.g., based on lateral dynamics of the vehicle), and the like.

Historical data 192 can include data, such as recommended lane data (e.g., to merge, historically it is better to be in a certain lane), historical wind data (e.g., particular road segments historically have a particular speed and direction of wind), traffic data (e.g., historically a certain amount of traffic at particular road segments at particular times or days, historically vehicles are at a particular speed on particular road segments at particular times or days, etc.). In some implementations, the historical data 192 is collected from AVs 101 over time (e.g., via sensing system 120, via perception system 130, sent to AV server 150, etc.). The historical data 192 can be used as predictive data about future scenarios. For example, sensor data 194 can indicate that another vehicle is in an adjacent lane and has an engaged turn signal, the historical data 192 can include information indicating that historically, the vehicle will enter the same lane that AV 101 currently occupies in 3 seconds and will be approximately 3 meters in front of the AV 101 at that time. In some implementations, forecast data (e.g., predicted data, estimated data, etc.) can be based on historical data. Historical data 192 can refer to collected historical data, estimated historical data, extrapolated data, forecast data, estimated data, predicted data, or the like. As used herein, instead of, in addition to, or included with historical data 192, forecast data (e.g., forecast traffic, forecast wind, forecast recommended lane, etc.), and the like can be used to generate physics-informed strategy data 196 and/or short time horizon route data.

Sensor data 194 (e.g., environmental sensing data) can include data obtained by sensing system 120 and/or include data from the perception system 130 that has been generated using the data from the sensing system 120. For example, sensor data 194 (e.g., environmental sensing data) can include information describing the environment of or proximate the AV 101 (e.g., position of other vehicles, obstacles, or other elements with respect to the AV 101).

The data generated by perception system 130 as well as various additional data (e.g., GPS data, route data 182, topographic data 184, map data 186, vehicle data 188, strategy and heuristic data 190, historical data 192, sensor data 194, physics-informed strategy data 196, and the like) can be used by an autonomous driving system, such as AV 101 control system (AVCS 140). The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as vehicle systems 160 (e.g., the powertrain, steering and braking 162, vehicle electronics 164, and signaling 166), and other systems and components not explicitly shown in FIG. 1. The powertrain, steering and braking 162 can include an engine (internal combustion engine, electric engine (motor), and so on), transmission (e.g., transmission gears), differentials, axles, wheels, steering mechanism, braking mechanism, and other systems. The vehicle electronics 164 can include an on-board computer, engine management, ignition, communication systems, carputers, telematics, in-car entertainment systems, and other systems and components. The signaling 166 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, steering and braking 162 (or signaling 166), whereas other instructions output by the AVCS 140 are first delivered to the electronics 164, which can generate commands to the powertrain, steering and braking 162 and/or signaling 166.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, steering and braking 162 (directly or via the electronics 164) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, steering and braking 162 (directly or via the electronics 164) to resume the previous speed settings of the vehicle.

In some implementations, architecture 100 can also include AV server 150 to communicate relevant information to and receive relevant information from AV 101. For example, relevant information can include traffic information, weather information, route information, among other information. In some implementations, AV server 150 can be, at least at times, communicating with AV 101 via network 170. In some implementations, AV 101 can be connected to network 170 at most or all times. In some implementations, AV 101 can establish connections to network 170 intermittently, when an appropriate network signal is available. In some implementations, AV 101 can be connected to network 170 prior to starting the driving mission. Network 170 can use a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 152 (on the side of AV server 150). Network interfaces 106 and 152 can include antennas, network controllers, radio circuits, amplifiers, analog-to-digital and digital-to-analog converters, physical layers (PHY), media access control layers (MAC), and the like.

In some implementations, architecture 100 can also include a data repository 180. In some implementations, the data repository 180 is memory (e.g., random access memory), a drive (e.g., a hard drive, a flash drive), a database system, or another type of component or device capable of storing data. In some implementations, data repository 180 includes multiple storage components (e.g., multiple drives or multiple databases) that span multiple computing devices (e.g., multiple server computers). In some implementations, the data repository 180 stores one or more of route data 182, topographic data 184, map data 186, vehicle data 188, strategy and heuristic data 190, historical data 192, sensor data 194, physics-informed strategy data 196, and the like. In some implementations, at least a portion of the data shown in FIG. 1 as being stored in data repository 180 is stored in AV server 150 and/or AV 101.

In some implementations, architecture 100 includes a strategy module 142. In some implementations, the strategy module 142 is hosted by the AV server 150. In some implementations, the strategy module 142 is hosted by the AV 101 (e.g., in AVCS 140). In some implementations, the AVCS includes one or more of strategy module 142 (e.g., constrained, full route planning module), routing module 144, and/or motion control module 146.

In some implementations, the routing module 144 receives data, such as route data 182, map data 186, and sensor data 194, and generates, based on the data, short time horizon plan data. For example, routing module 144 receives route data 182 indicating that the AV 101 is to travel along a particular road, map data 186 indicating regulatory speed limits of the particular road, and sensor data 194 indicating locations of vehicles and/or objects proximate the AV 101. The routing module 144 generates, based on the route data 182, map data 186, and sensor data 194, a short time horizon routing data including instructions (e.g., commands) of vehicle actions of the AV 101 for the next interval (e.g., 10 seconds). The routing module 144 transmits the short time horizon routing data to the motion control module 146 and the motion control module 146 controls one or more of the actuators (e.g., the vehicle systems 160) of the AV 101 based on the short time horizon routing data for the next interval (e.g., 10 seconds). The routing module 144 continues generating (e.g., regenerating, refreshing) short time horizon routing data (e.g., every 100 ms) (e.g., based on current route data 182, map data 186, and sensor data 194), transmitting the short time horizon routing data to the motion control module 146, and the motion control module controls the actuators based on the short time horizon plan data.

In some implementations, the strategy module 142 can interface with routing module 144 and motion control module 146. The operations of strategy module 142 are further described below in conjunction with the following Figures. The strategy module 142 identifies (e.g., retrieves from data repository 180 or receives from appropriate AV components or AV server) data, such as route data 182, topographic data 184, map data 186, vehicle data 188, strategy and heuristic data 190, historical data 192, sensor data 194, etc. The strategy module 142 generates, based on the identified data, physics-informed strategy data 196 for segments of a route to be traveled by AV 101. In some implementations, the strategy module applies one or more rules to the identified data (e.g., to specific parameters or characteristics in the identified data).

In some implementations, a rule specifies that a type of braking is to be used for a segment of a route responsive to the identified data meeting a threshold grade value, a threshold distance value, a threshold mass, and a type of braking capability. In some examples, a rule specifies that friction braking is to be used responsive to the identified data including 2% or greater downhill grade value for the segment, a 0.1 mile or less distance value for the segment, a threshold mass of the AV, and the AV having friction brakes. In some examples, a rule specifies that engine braking is to be used responsive to the identified data having 2% or greater downhill grade value, at least a 0.5 mile distance value, a threshold mass of the AV, and the AV having engine braking capability.

In some implementations, a rule specifies that a specific speed value (e.g., calculated speed, calculated maximum speed) is to be used for a segment of a route responsive to the identified data meeting a threshold grade value, a threshold distance value, a threshold mass, and a powertrain capability (e.g., engine capability). In some examples, a rule specifies that a 30 mph speed value is to be used responsive to the identified data including 3% uphill grade value, at least a 0.5 mile distance value, a threshold mass of the AV, and the AV having particular engine capability.

In some implementations, a rule specifies a rate of deceleration value and/or speed value to be used for a segment of a route responsive to the identified data meeting a threshold grade value of the segment, a threshold radius of curvature value of the segment, and a total mass.

In some implementations, a rule specifies a particular lane in which to travel responsive to the identified data indicating an upcoming merge or exit (e.g., route data 182) that is beyond the 10 second range for the short time horizon route data 220, historical data 192 indicating in which lane vehicles typically travel, sensor data 194 indicating amount of vehicles that are proximate the AV 101, and/or the like.

The physics-informed strategy data 196 (e.g., driving constraint data, physics-informed data) includes one or more of a corresponding type of braking for a corresponding segment of a route, a corresponding calculated maximum speed (e.g., less than a regulatory maximum speed) for a corresponding segment of the route based on physical limitations of the AV 101, a corresponding gear to be used for a corresponding segment of the route, a corresponding rate of change of speed for a corresponding segment of the route, a corresponding lane for a corresponding segment of the route, and/or the like. The physics-informed strategy data 196 may include instructions (e.g., in the form of a script, commands, etc.), textual recommendations in a particular format, or any other type/format of data. The strategy module 142 provides the physics-informed strategy data 196 to the routing module 144 and the motion control module 146. The routing module 144 generates the short time horizon routing data based on the physics-informed strategy data 196 (e.g., using a calculated maximum speed instead of a regulatory maximum speed, using a deceleration prior to a radius of curvature on a downhill grade, etc.).

In some implementations, the routing module 144 receives route data 182 indicating the roads the AV 101 is to travel, map data 186 indicating details of the roads (e.g., regulatory speed limits, lanes, radius of curvature, etc.), sensor data 194 (e.g., indicating objects that are proximate the AV 101), and the physics-informed strategy data 196 (e.g., what braking system to use, what speed to maintain, what gear to use, rate of change of speed, etc.). The routing module 144 can generate the short time horizon routing data that includes instructions (e.g., script, commands, etc.) of how the AV 101 is to move for the next 10 seconds (e.g., continue in a straight line, steer to the left or right, accelerate, decelerate, maintain speed, etc.). The short time horizon routing data includes instructions based on the physics-informed strategy data 196 (e.g., braking system, speed, gear, change of speed, etc.).

The motion control module 146 controls the actuators based on the short time horizon routing data and based on the physics-informed strategy data 196 (e.g., using a type of braking system). In some implementations, the short time horizon routing data includes instructions (e.g., based on an updated speed limit calculated based on the physics-informed strategy data 196) and the motion control module 146 executes the instructions to control the vehicle systems 160. In some implementations, the physics-informed strategy data 196 includes an indication of how to use the vehicle systems 160 (e.g., use a specific type of braking, use a particular gear, etc.) and the motion control module 146 generates instructions (e.g., script, commands) or adjusts instructions (e.g., script, commands) received from the routing module 144 to control the vehicle systems 160.

In some examples, a first segment of a route is a 4% downhill grade that lasts a short time longer than 10 seconds, a second segment of the route may be flat, and a third segment of a route is a 4% downhill grade that lasts for 10 minutes. The strategy module 142 may generate, based on this data, physics-informed strategy data 196. The AVCS 140 may use this physics-informed strategy data 196 to cause the AV 101 to coast with the engine brake (e.g., without shifting) for the first segment of the route and rolling back down to the target road speed when on the flat second segment of the route. The AVCS 140 may use the physics-informed strategy data 196 to downshift to an appropriate gear and slow down to a grade target speed before starting the descent of the third segment of the route. Shifting and down speeding appropriately has a significant positive impact on fuel economy, In some examples, a segment of a route has an uphill grade at a corresponding altitude. The strategy module 142 may generate, based on the data, physics-informed strategy data 196. The AVCS 140 may use this physics-informed strategy data to cause the AV 101 to move at a calculated maximum speed limit that is lower than the regulatory maximum speed limit. Based on external variables which affect maximum engine power (e.g., altitude) and current vehicle payload, the calculated maximum speed limit (e.g., adjusted road speed limit for the grade) that the AV 101 can travel up the uphill grade may be significantly lower than the regulatory maximum speed limit (e.g., general road speed limits).

By generating and using physics-informed strategy data 196, the routing module 144 does not have to use arbitrarily large planning horizons. In some implementations, the strategy module 142 embeds the physics-informed strategy data 196 in the map data 186 and the map data 186 is then used by the routing module 144 to generate the short time horizon routing data. In some examples, the strategy module 142 applies a rule to the received data (e.g., mass of AV 101, engine capability, grade value, available transmission gear ratios, etc.) to determine an adjusted speed value (e.g., the speed that the AV 101 can climb a grade based on physical constraints of the AV 101) that the AV 101 is to travel a segment of the route. The strategy module 142 then causes the map data 186 to be updated with the adjusted speed value. In some examples, the strategy module 142 applies one or more rules to the received data (e.g., map data 186 such as a regulatory speed limit, engine capability, total mass, etc.) to determine a recommended gear that the AV 101 is to use to travel a segment of the route.

The use of the physics-informed strategy data 196 provides physics-informed optimization, such as decreasing wear-and-tear on the vehicle systems 160 of the AV 101, decreasing accumulated error, decreasing probability of collisions, providing energy savings (e.g., an energy savings action), and/or the like. An energy saving action can refer to a vehicle action that results in reduction of energy consumed by an AV. With respect to an AV with an internal combustion engine (ICE), an energy saving action can include a fuel saving action. With respect to an AV with an electric engine (e.g., electric motor) or hybrid AV, an energy saving action can include a power or electricity saving action. In some implementations, an energy saving action can include at least one of a disengagement of a powertrain of the AV, a withholding of a supply of energy to an engine of the AV, or a regenerative energy action. Disengagement of a powertrain can include placing the AV in neutral gear (e.g. coasting) or decoupling the power of the engine from the wheels. Withholding a supply of energy to an engine of the AV 101 can include reducing or stopping fuel injection to the ICE or reducing or stopping the electricity provided to the electric engine (e.g., motor). A regenerative energy action can include an action that returns to or generates energy for the AV. A regenerative braking technique that returns energy to the AV through braking or other regenerative technique can be implemented.

Figure 2:
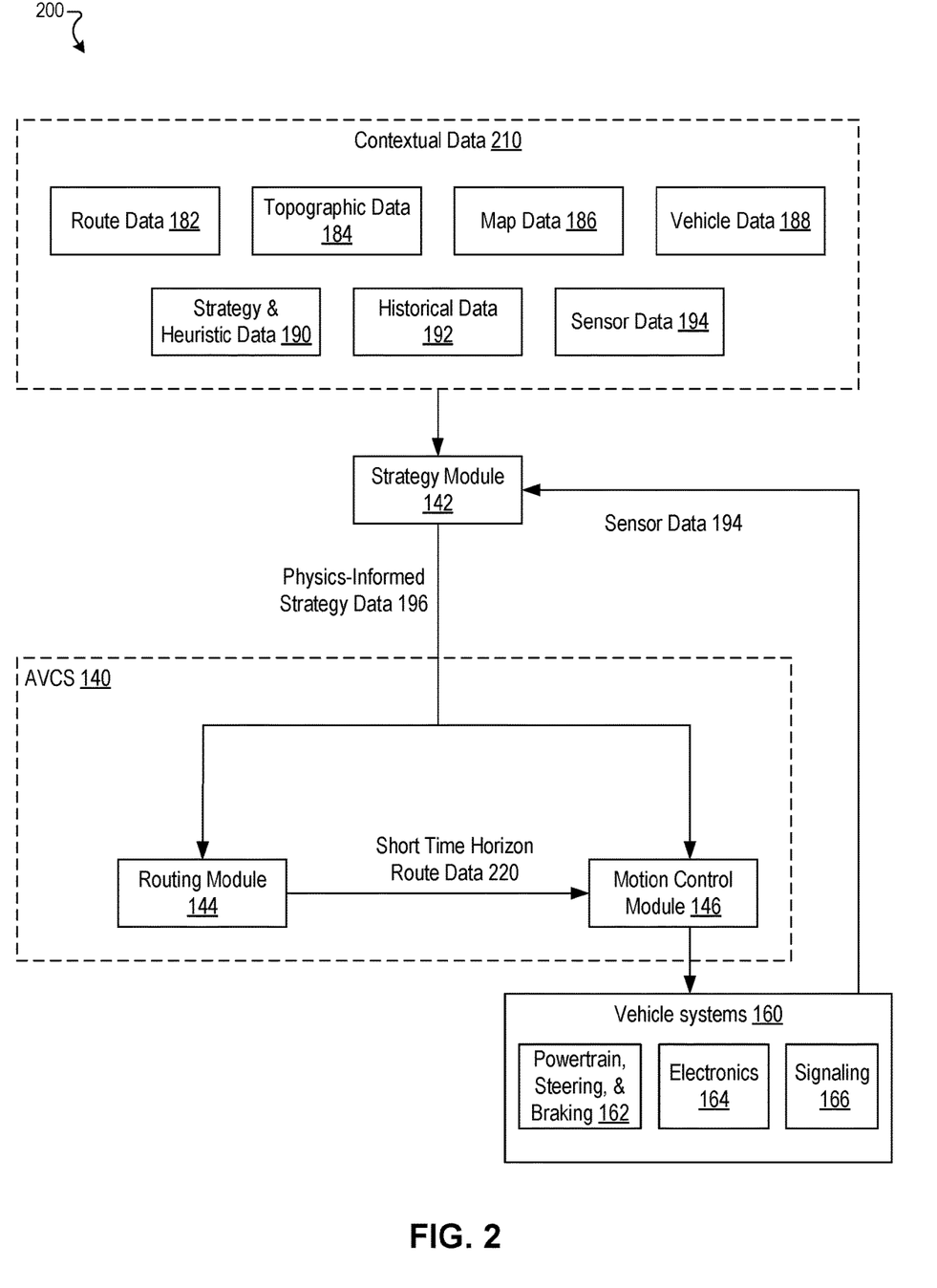
FIG. 2 is a diagram illustrating components of an example architecture of a system and example data flows pertaining to physics-informed optimization, in accordance with some implementations of the disclosure.

FIG. 2 is a diagram illustrating components of an example architecture 200 of a system and example data flows pertaining to physics-informed optimization, in accordance with some implementations of the disclosure. Components of FIG. 1 are used to help describe aspects of FIG. 2.

In some implementations, the strategy module 142 provides physics-informed optimization for the AV. In some implementations, an AV server 150 includes the strategy module 142. In some implementations, the AVCS 140 of the AV includes the strategy module 142.

The strategy module 142 receives contextual data 210, such as one or more of route data 182, topographic data 184, map data 186, vehicle data 188, strategy and heuristic data 190, historical data 192, sensor data 194, and/or the like. In some implementations, strategy module 142 receives sensor data 194 from the vehicle systems 160 (e.g., data is exchanged between the strategy module 142 and the vehicle systems 160). The strategy module 142 generates physics-informed strategy data 196 based on the contextual data 210.

In some implementations, the physics-informed strategy data 196 is a text file, a script, an executable binary file, and/or the like. In some implementations, the strategy module 142 embeds the physics-informed strategy data 196 in other data, such as the map data 186. The strategy module 142 provides the physics-informed strategy data 196 (e.g., alone, embedded in other data, etc.) to the routing module 144 and the motion control module 146.

In some implementations, routing module 144 is the primary authority and/or component involved in planning and decision making on positioning and operation of the AV. The routing module 144 receives data, such as the physics-informed strategy data 196, route data 182, map data 186, and sensor data 194, and makes decision about the positioning of the AV with respect to the external environment based on the data received.

The routing module 144 generates short time horizon routing data 220 (e.g., associated with moving the AV over the next 10 seconds) based on at least a portion of the physics-informed strategy data 196 and transmits the short time horizon routing data 220 to the motion control module 146. In some implementations, the short time horizon routing data 220 is a file (e.g., a text file, etc.) and the motion control 146 generates commands (e.g., script, instructions) to control the vehicle systems 160 based on the short time horizon routing data 220. In some implementations, the short time routing data 220 includes commands (e.g., a script, instructions, etc.) and the motion control module 146 passes the commands (e.g., as received or after updating the commands) to the vehicle systems 160 to control the vehicles systems 160. The motion control module 146 executes the short time horizon routing data 220 (e.g., commands, such as a calculated maximum speed limit) based on the physics-informed strategy data 196 (e.g., constraints, such as type of braking to use). In some implementations, the AVCS 140 controls the position of the AV based on a very strict tolerance (e.g., within a few centimeters from the requested position). For example, the AVCS 140 can evaluate received data (e.g., sensor data 194 indicating location of objects proximate the AV) and determine a position of the AV with respect to the external environment to move the AV. In some examples, the routing module 144 receives the sensor data indicating that another vehicle is two seconds ahead of the AV. The routing module 144 then generates a short time horizon routing data 220 indicating that the braking system is to be actuated to cause the AV to be at least three seconds behind the other vehicle. In some implementations, the motion control module 146 is expected to use the short time horizon routing data 220 (e.g. in view of the physics-informed strategy data 196) within the constraints imposed by the short time horizon routing data 220 (e.g. in view of the physics-informed strategy data 196) such that the position of the AV as determined by the AVCS 140 can be controlled with precision.

In some examples, physics-informed strategy data 196 can indicate, for a segment of a route, a calculated maximum speed (e.g., that is less than a regulatory maximum speed), a type of braking, a gear ratio to be used, a rate of deceleration, and/or a lane in which to travel. The strategy module 142 can send at least a first portion of the physics-informed strategy data 196 (e.g., the calculated maximum speed, rate of deceleration, lane in which to travel, etc.) to the routing module 144 and at least a second portion of the physics-informed strategy data 196 (e.g., type of braking, gear ratio, etc.) to the motion control module 146. The routing module 144 can generate short time horizon routing data 220 for the next interval of time (e.g., 10 seconds) based on the at least a first portion of the physics-informed strategy data 196 (e.g., calculated maximum speed, rate of deceleration, lane in which to travel, etc.). The motion control module 146 can control the vehicle systems 160 based on the at least a second portion of the physics-informed strategy data 196 (e.g., type of braking and/or gear ratio of the physics-informed strategy data 196 and based on the short time horizon routing data 220).

Figure 3A:
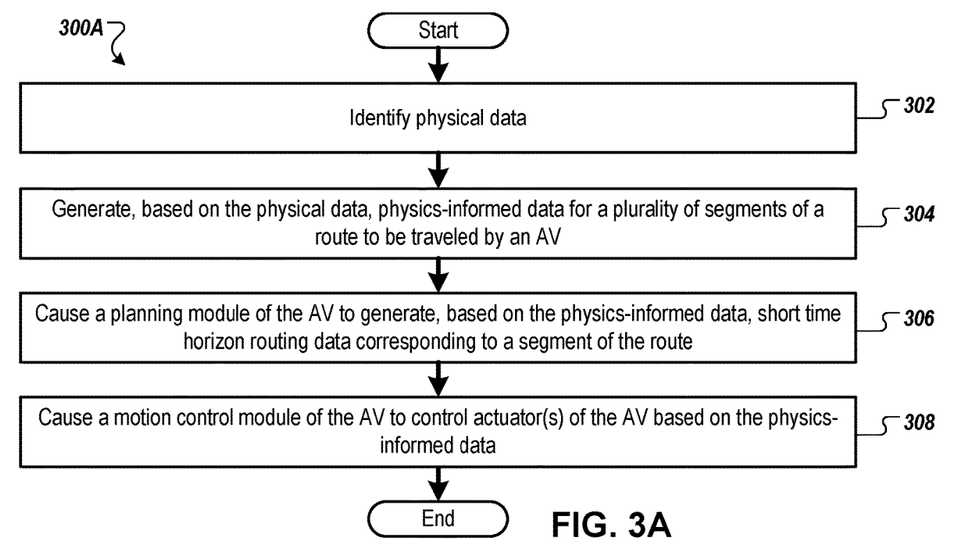
FIGS. 3A-B depict flow diagrams of example methods of performing physics-informed optimization, in accordance with some implementations of the disclosure.
Figure 3B:
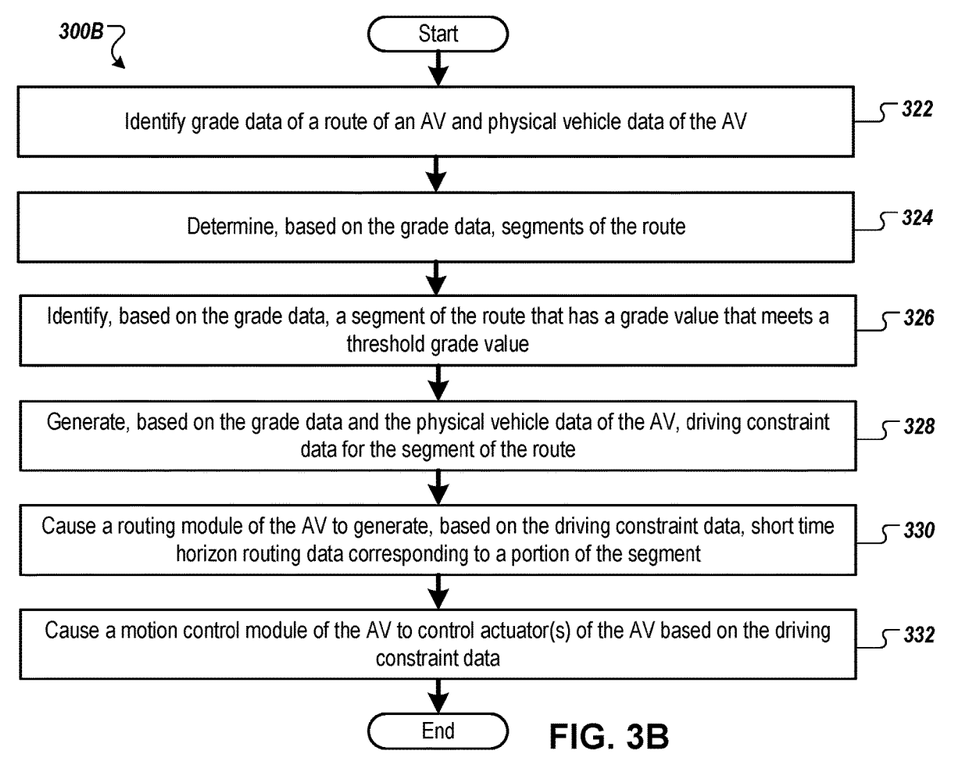

FIGS. 3A-B depict flow diagrams of example methods 300A-B of performing physics-informed optimization, in accordance with some implementations of the disclosure. Method 300A-B and/or each of the individual functions, routines, subroutines, or operations of methods 300A-B can be performed by a processing device, having one or more processing units (CPU) and memory devices communicatively coupled to the CPU(s). The processing device executing methods 300A-B can be part of a server (located outside an autonomous vehicle, such as AV server 150) or a client processing module (located within or at the autonomous vehicle, such as AVCS 140), or any combination thereof. In some implementations, methods 300A-B can be performed by a single processing thread or alternatively by two or more processing threads, each thread executing one or more individual functions, routines, subroutines, or operations of the method. Methods 300A-B as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, methods 300A-B are performed by strategy module 142 described in FIGS. 1 and 2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed.

Referring to FIG. 3A, at operation 302 of method 300A, processing logic identifies physical data. The physical data can be stored in at least one data repository and can be retrieved from the data repository. Alternatively, processing logic can receive some or all of the physical data from various components of an AV and/or from a server. In some implementations, the physical data includes physical route data of a route of an AV and physical vehicle data of the AV. In some implementations, the physical data further includes historical data including one or more of recommended lane data, historical wind data, or traffic data. In some implementations, the route (e.g., planned route, specific path in a road network) is generated based on a mission (e.g., desired starting and ending location) that has been defined.

In some implementations, the physical route data includes a corresponding length value corresponding to each of the segments of the route and a corresponding grade value corresponding to each of the segments of the route. In some implementations, the route is divided into segments, where each of the segments has a corresponding grade value that is substantially constant over the corresponding length of a corresponding segment of the route (e.g., the segments are different lengths). In some examples, a first segment of the route is substantially flat for 10 miles and a second segment has a 3% uphill grade for 1 mile. In some implementations, the route is further divided into segments for each corresponding radius of curvature of the route, for each portion of the route that has historical data (e.g., historical wind, historical traffic, etc.) that is different from other portions of the route, etc.

In some implementations, the physical vehicle data includes at least one of total mass of the AV, braking capabilities of the AV, transmission gear ratios of the AV, wheelbase data of the AV, engine capabilities of the AV, and/or the like.

At operation 304, processing logic generates, based on the physical data, physics-informed data (also referred as "physics-informed strategy data") for segments of a route to be travelled by an AV. In some implementations, the physics-informed data includes context and/or constraints to improve actuator usage for one or more segments of the route.

Route data, topographic data, map data (e.g., roadway data, maximum and minimum speed limits, etc.), vehicle data (e.g., current vehicle configuration, total mass, wheelbase, etc.), best practices (e.g., professional driver strategies, heuristics, etc.), historical data (e.g., traffic, weather, etc.), and/or the like can be provided to the processing logic. The processing logic can incorporate this data to create the physics-informed data for the segments of the route. The physics-informed data for the segments of the route can include improved road and trajectory constraints for the routing module (e.g., altered location based maximum road speed limits, adapted location based trajectory limits, etc.) and additional context or constraints for the motion control module to improve actuator usage (e.g., recommended gear selection or representation of grade severity such as distance plus steepness, location based actuator strategies such as transmission, etc.).

In some implementations, the physics-informed data includes a corresponding type of braking for one or more segments of the route. In some examples, the physics-informed data recommends friction braking (e.g., using friction brake pads) for a short downhill grade). In some examples, the physics-informed data recommends downshifting (e.g., putting the AV in a lower gear) and/or engine braking instead of friction braking for a longer downhill grade. For a corresponding segment, the physics-informed data may recommend one or more of regenerative braking, friction braking, engine braking, downshifting, exhaust braking, or using drive line retarders.

In some implementations, the physics-informed data includes a corresponding calculated maximum speed (e.g., lower than the regulatory maximum speed) for one or more segments of the route based on physical limitations of the AV. In some example, the calculated maximum speed is based on the total mass of the AV, the engine capabilities of the AV, etc.

In some implementations, the physics-informed data includes a corresponding gear (e.g., gear ratio) to be used for one or more segments of the route. In some implementations, the corresponding gear is based on one or more of the calculated maximum speed, downshifting, deceleration, etc.

In some implementations, the physics-informed data includes a corresponding rate of change of speed (e.g., acceleration, deceleration) for one or more segments of the route. In some examples, physics-informed data includes a recommended deceleration for a downhill grade with a radius of curvature.

In some implementations, the physics-informed data includes a corresponding lane for one or more segments of a route. In some examples, for a segment of the route where the AV is to merge onto another road, the physics-informed data recommends that the AV be in a corresponding lane.

In some implementations, the processing logic further identifies sensor data from a perception system of the AV (e.g., processing logic receives sensor data from the vehicle systems). In some implementations, the sensor data is associated with environment of the AV (e.g., wind data, object proximity data, etc.). In some implementations, the sensor data is associated with one or more vehicle systems of the AV. In some implementations, the processing logic generates the physics-informed data further based on the sensor data.

In some examples, the sensor data indicates a current wind value, the topologic data indicates a downhill grade, the map data indicates a radius of curvature, and the vehicle data indicates a total mass of the AV. The processing logic applies one or more rules to determine that the AV is to travel at a particular maximum speed responsive to the identified data meeting a threshold wind value, a threshold downhill grade value, the road having a threshold radius of curvature, and the AV meeting a threshold mass.

In some examples, the sensor data indicates slow-moving objects (e.g., backed-up traffic) beyond the interval (e.g., 10 seconds) of the short time horizon routing data. The processing applies one or more rules to determine that the AV is to decelerate to a particular speed before the objects are within the interval (e.g., 10-second window) of the short time horizon routing data based on the sensor data indicating an object within a threshold distance moving at a threshold speed.

In some implementations, the processing logic identifies updated data (e.g., updated vehicle data associated with current vehicle capacities, updated sensor data associated with current environmental conditions, etc.) and the processing logic revises the physics-informed data based on the updated data. In some implementations, the processing logic applies the one or more rules to generate updated or new physics-informed data based on the updated data (e.g., the processing logic repeats operation 304 based on the updated data).

At operation 306, processing logic causes a routing module of the AV to generate, based on the physics-informed data for the segments of the route, short time horizon routing data corresponding to one of the segments of the route. In some implementations, the short time horizon routing data is for a next interval of time (e.g., the next 10 seconds, next 100 ms). The AV is to travel the segment of the route (e.g., the next 10 seconds) based on the short time horizon routing data. In some implementations, the short time horizon routing data includes additional constraints based on the physics-informed data.

In some examples, the short term time horizon routing data generated without the physics-informed data would include instructions to use a regulatory maximum speed of 65 mph. The short term horizon routing data generated based on the physics-informed data for the segments of the route would use a calculated maximum speed of 50 mph (e.g., based on physical constraints of the AV for the grade, the length of the grade, the radius of curvature, etc.).

At operation 308, processing logic causes a motion control module of the AV to control one or more actuators of the AV based on the physics-informed data for the segments of the route (e.g., during travelling of the AV on the route). The one or more actuators are further controlled by the motion control module based on the short time horizon routing data (e.g., generated based on the physics-informed data for the segments of the route) to cause the AV to travel along the route. The one or more actuators may include one or more of the engine of the AV, transmission gears of the AV, one or more braking (e.g., slowing down, decelerating) systems of the AV, etc.

In some examples, the motion control module causes the actuators (e.g., vehicle systems) to use a corresponding braking system and/or corresponding transmission gears during one or more segments of the route responsive to receiving the physics-informed data from the strategy module. In some examples, the motion control module causes the actuators to control the throttle to move the AV at a calculated maximum speed that is lower than a regulatory maximum speed limit responsive to receiving the short time horizon routing data (e.g., generated by the routing module based on the physics-informed data for the segments of the route) from the routing module.

In some examples, an AV is approaching a 3% uphill grade on a highway with a 65 mph speed limit. Given the current loading condition of the vehicle and the power rating of the propulsion unit (e.g., diesel engine, electric motor, etc.), the maximum speed based on terrain and vehicle capacity is 55 mph. The physics-informed data (e.g., precomputed adaption) informs the routing module of the altered maximum road speed, resolving the potential discrepancy between a desired speed of the routing module and what the AV is physically capable of.

In some examples, an AV is approaching a minutes-long 4% downhill grade which requires usage of engine braking to avoid overheating of the friction brakes. The processing logic uses the identified data to generate physics-informed data that is provided to the routing module to generate short time horizon routing data associated with a reduced local maximum road speed (e.g., based on pre-calculated route information). The physics-informed data can be also used by the motion control module to cause the vehicle systems to use a preferred gear to produce the correct mechanical advantage to match the engine brake torque available from the engine with the preferred road speed for the grade. This physics-informed data provides a strategy a priori to allow the system to maximally avoid friction brake usage.

In some examples, an AV is approaching a seconds-long grade, just beyond the current interval of time (e.g., 10 seconds) of the current short time horizon plan data. The physics-informed data (e.g., pre-calculated route information) may inform the motion control module about the relatively low severity (e.g., very short but somewhat steep) of the current grade (e.g., without adapting the maximum road speed). The motion control module controls the actuators to use the engine brake while avoiding unnecessary downshifting based on the physics-informed data.

Referring to FIG. 3B, at operation 322 of method 300B, processing logic identifies grade data of a route of an AV and physical vehicle data of the AV. The grade data may include steepness values (e.g., slope, grade) and length values of the route. For example, a first portion of the route may have a 4% downhill grade for 5 miles. The physical vehicle data may include at least one of total mass of the AV, braking capabilities of the AV, transmission gear ratios of the AV, wheelbase data of the AV, and/or engine capabilities of the AV.

At operation 324, processing logic may determine, based on the grade data, segments of the route. Each of the segments may have a corresponding substantially constant grade. For example, a first segment may have a substantially 4% downhill grade over the length of the first segment, a second segment may have a substantially flat grade over the length of the second segment, and a third segment may have a substantially 1% uphill grade over the length of the first segment. In some implementations, the grade of each segment meets a threshold range of grade values (e.g., 3.5-4.5% downhill grade). In some implementations, the route is split into segments at portions where the grade changes more than a threshold range of grade values.

At operation 326, processing logic identifies, based on the grade data, a segment of the route that has a grade value that meets a threshold grade value. The threshold grade value may include threshold downhill grade value and/or a threshold uphill grade value.

In some implementations, the grade value includes a steepness value and a length value for the segment. The threshold grade value may include a threshold steepness value and a threshold length value. In some implementations, there are multiple threshold grade values (e.g., multiple combinations of threshold steepness value and threshold length value). In some examples, a 2% downhill grade for 5 miles meets a first threshold grade value and a 4% downhill grade for 1 mile meets a second threshold grade value. In some implementations, different threshold grade values may be further based on weather data, traffic data, physical vehicle data of the AV, and/or the like. For example, a 2% downhill grade for 1 mile under dry road conditions may not meet a threshold grade value and a 2% downhill grade for 1 mile under slick road conditions may meet a threshold grade value.

At operation 328, processing logic generates, based on the grade data and the physical vehicle data of the AV, driving constraint data (e.g., physics-informed data) for the segment of the route. The driving constrain data may be further based on recommended lane data, historical wind data, and/or traffic data.

In some examples, responsive to the grade value of the segment meeting a threshold downhill grade value, the driving constraint data may include a type of braking (e.g., one or more of regenerative braking, friction braking, engine braking, downshifting, exhaust braking, or using drive line retarders). In some examples, responsive to the grade value of the segment meeting a threshold uphill grade value, the driving constraint data may include a calculated maximum speed for the segment based on physical limitations of the AV. The calculated maximum speed may be less than a corresponding maximum regulatory speed. In some examples, the driving constraint data may include a gear to be used for travelling the segment, a rate of change of speed for travelling the segment, and/or a lane for travelling the segment.

At operation 330, processing logic causes a routing module of the AV to generate, based on the driving constraint data for the segment of the route, short time horizon routing data corresponding to a portion of the segment. In some examples, the short time horizon routing data is for the next short period of time (e.g., next 10 seconds). The short time horizon routing data may indicate a type of braking, a calculated maximum speed, and/or the like based on the driving constraint data.

At operation 332, processing logic causes a motion control module of the AV to control one or more actuators (e.g., engine, transmission gears, one or more braking systems, and/or the like) of the AV based on the driving constraint data during travelling of the AV on the route. The one or more actuators of the AV may be further controlled by the motion control module based on the short time horizon routing data to cause the AV to travel along the route. In some examples, the motion control module may use a type of braking, a particular gear, and/or the like based on the driving constraint data.

In some implementations, processing logic receives updated data. In some examples, the updated data includes sensor data received from the perception system of the AV. In some examples, the updated data includes an updated route (e.g., with updated grade data). In some examples, the updated data includes updated physical vehicle data of the AV (e.g., updated tire pressure, updated capacity of the power train, updated total AV mass, etc.). The processing logic may repeat one or more operations of method 300B based on the updated data.

Figure 4:
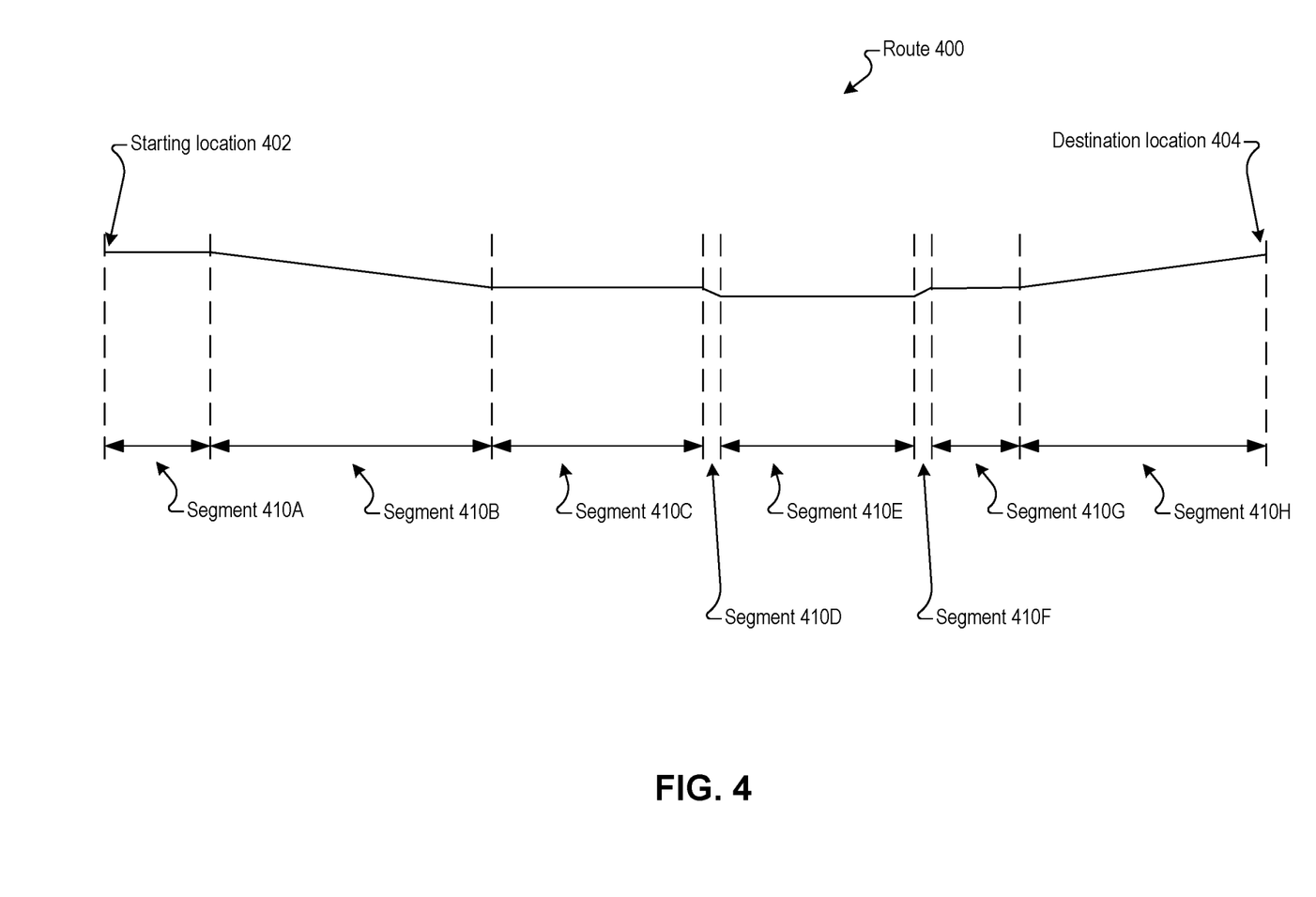
FIG. 4 depicts a route for physics-informed optimization, in accordance with some implementations of the disclosure.

FIG. 4 depicts a profile view of a route 400 for physics-informed optimization in accordance with some implementations of the disclosure. The profile view of the route 400 displays the different grades (e.g., steepness, slope) of different portions of the route.

The route 400 may include a starting location 402 and a destination location 404. In some implementations, the starting location 402 and destination location 404 are received by processing logic (e.g., strategy module 142 of FIGS. 1-2) via user input. The processing logic may determine a route 400 between from the starting location 402 to the destination location 404. The processing logic identifies grade data of the route 400. The processing logic may determine segments 410 of the route 400 based on the grade data. In some examples, a segment 410 is a portion of the route 400 that has a substantially constant grade. Referring to FIG. 4, segments 410A, 410C, 410E, and 410G each has a substantially flat grade. Segments 410B and 410D each has a corresponding downhill grade. Segments 410F and 410H each has a corresponding uphill grade. The processing logic may determine one or more segments 410 of the route 400 that has a grade value that meets a threshold grade value. The grade value may include a steepness value and a length value and the threshold grade value may include a threshold steepness value (e.g., threshold slope) and a threshold length value. In some examples, segment 410B may have a downhill grade value that meets the threshold downhill grade value and segment 410D (e.g., that has a length that is shorter than the length of segment 410B) may have a downhill grade value that does not meet the threshold downhill grade value. In some examples, segment 410H may have an uphill grade value that meets the threshold uphill grade value and segment 410F (e.g., that has a length that is shorter than the length of segment 410H) may have an uphill grade value that does not meet the threshold uphill grade value.

The processing logic may generate, based on the grade data and the physical vehicle data (e.g., physics informed data) of the AV, driving constraint data for one or more segments 410 of the route 400. In some examples, first driving constraint data for segment 410B includes using downshifting and engine braking (e.g., responsive to grade and/or length of segment 410B meeting a first threshold grade and/or length and the physical vehicle data including downshifting and engine braking). Friction braking may be used for segment 410D (e.g., length and/or grade of the segment 410D is not great enough to meet the threshold grade value for downshifting and engine braking). In some examples, second driving constraint data for segment 410H includes using a calculated maximum speed that is lower than the regulatory maximum speed for segment 410H (e.g., responsive to a grade and/or length of segment 410H meeting a second threshold grade and/or length and the physical vehicle data indicating that the calculated maximum speed may be maintained for the grade and length of segment 410H).

The processing logic may generate corresponding driving constraint data for one or more of the segments 410 of route 400. The processing logic may receive updated data (e.g., updated route, weather data, sensor data, powertrain capability data, traffic data, wind data, etc.) and re-determine the route, segments of the route, and/or driving constraint data for segments.

The processing logic may cause a routing module of the AV to generate, based on the driving constraint data, short time horizon routing data corresponding to a portion of a segment 410 (e.g., the next ten seconds). In some implementations, the driving constraint data is embedded in the map data that is provided to the routing module. The routing module may refresh (e.g., re-generate) the short time horizon routing data over short intervals of time. The routing module may provide the short time horizon data to the motion control module of the AV to control actuators of the AV to cause the AV to travel along the route. The processing logic may also cause the motion control module of the AV to control actuators of the AV based on the driving constraint data.

Figure 5:
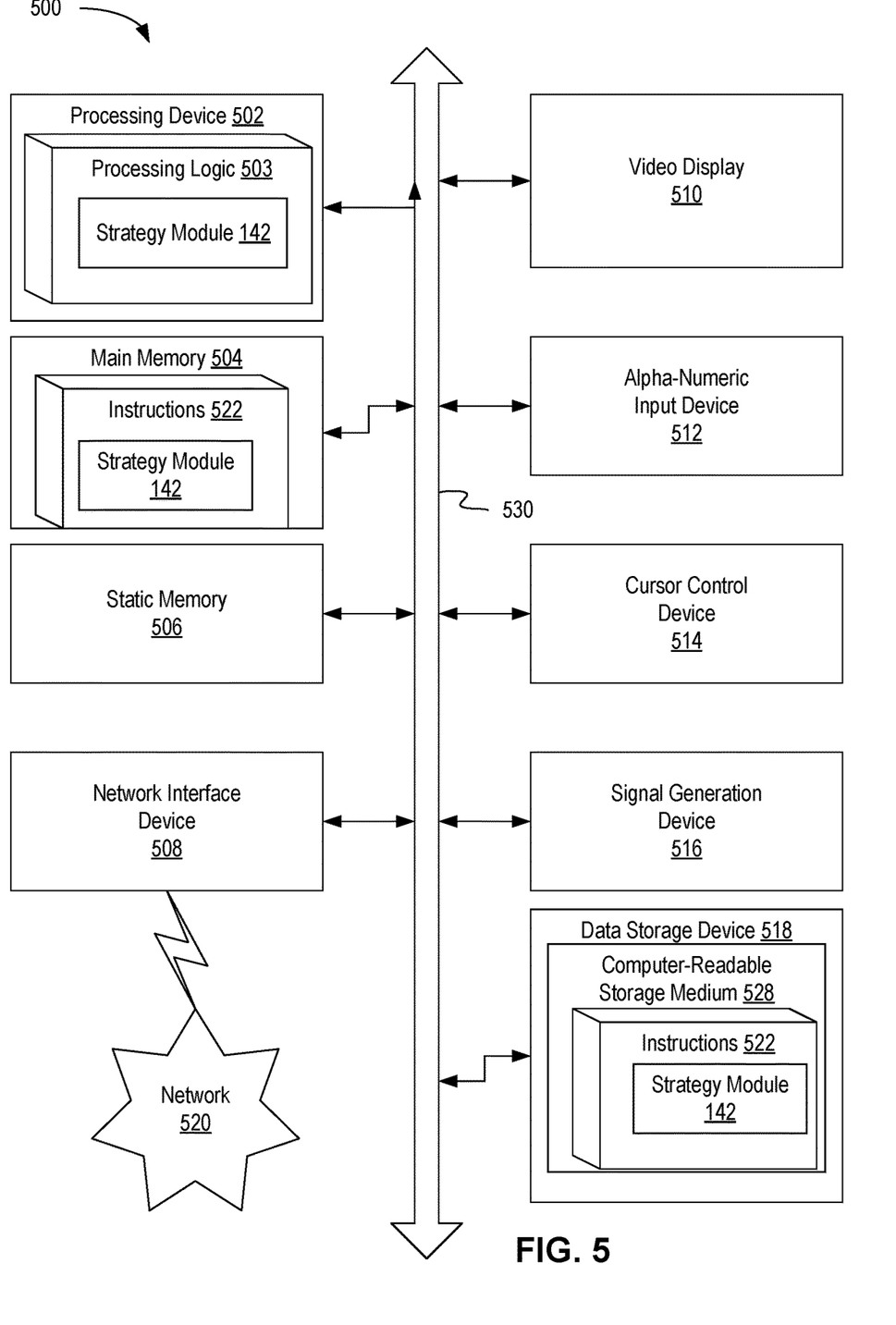
FIG. 5 depicts a block diagram of an example computer device within which a set of instructions, for causing the machine to perform any of the one or more methodologies discussed herein can be executed, in accordance with some implementations of the disclosure.

FIG. 5 depicts a block diagram of an example computer device 500 within which a set of instructions, for causing the machine to perform any of the one or more methodologies discussed herein can be executed, in accordance with some implementations of the disclosure. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the computer device 500 is AV server 150. In some implementations, the AV 101 includes computer device 500 (e.g., AVCS 140 is computer device 500). In some implementations, computer device 500 executes the strategy module 142.

Example computer device 500 can include a processing device 502 (also referred to as a processor or CPU), which can include processing logic 503, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which can communicate with each other via a bus 530.

Processing device 502 represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 502 can be configured to execute instructions performing any of the operations performed by strategy module 142.

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the disclosure, executable instructions 522 can comprise executable instructions to perform any of the operations of strategy module 142.

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," "some embodiments," "an implementation," "one implementation," "some implementations," or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
identifying, based on grade data of a route of an autonomous vehicle (AV), a segment of the route that has a grade value that meets a threshold grade value;
identifying map data of a road network associated with the route;
responsive to identifying the segment, generating, based on the grade data and physical vehicle data of the AV, driving constraint data for the segment of the route;
embedding the driving constraint data in the map data to generate map data embedded with the driving constraint data;
while the AV is travelling the segment of the route, identifying current environmental sensing data for a portion of the segment of the route, the current environmental sensing data being associated with a position of one or more objects proximate the AV;
causing the AV to generate, based on the map data embedded with the driving constraint data for the segment of the route and the current environmental sensing data associated with the portion of the segment of the route, short time horizon routing data corresponding to the portion of the segment; and
causing the AV to travel the portion of the segment of the route based on the short time horizon routing data.

2. The method of claim 1, wherein:
the grade value comprises a steepness value and a length value for the segment; and
the threshold grade value comprises a threshold steepness value and a threshold length value.

3. The method of claim 2, wherein the threshold steepness value is a threshold downhill steepness value, wherein the driving constraint data comprises a type of braking for the segment, and wherein the AV is to travel the portion of the segment using the type of braking.

4. The method of claim 3, wherein the type of braking comprises one or more of regenerative braking, friction braking, engine braking, downshifting, exhaust braking, or using drive line retarders.

5. The method of claim 2, wherein the threshold steepness value is a threshold uphill steepness value, wherein the driving constraint data comprises a calculated maximum speed for the segment based on physical limitations of the AV, the calculated maximum speed being less than a corresponding maximum regulatory speed, and wherein the AV is to travel the portion of the segment based on the calculated maximum speed.

6. The method of claim 1 further comprising determining, based on the grade data, a plurality of segments of the route, wherein each corresponding segment of the plurality of segments has a corresponding grade that is substantially constant over a length of the corresponding segment, and wherein the plurality of segments comprises the segment.

7. The method of claim 1, wherein the physical vehicle data comprises at least one of total mass of the AV, braking capabilities of the AV, transmission gear ratios of the AV, wheelbase data of the AV, or engine capabilities of the AV.

8. The method of claim 1 further comprising:
causing the AV to control one or more actuators of the AV based on the driving constraint data during travelling of the AV on the route, wherein the one or more actuators of the AV are to be further controlled based on the short time horizon routing data to cause the AV to travel along the route.

9. The method of claim 8, wherein the one or more actuators comprise at least one of an engine of the AV, transmission gears of the AV, or one or more braking systems of the AV.

10. The method of claim 1, wherein the generating of the driving constraint data is further based on one or more of recommended lane data, historical wind data, or traffic data.

11. The method of claim 1, wherein the identifying of the current environmental sensing data comprises receiving, from a perception system of the AV, the current environmental sensing data associated with environment of the AV.

12. The method of claim 8, wherein the driving constraint data comprises at least one of a gear to be used for travelling the segment, a rate of change of speed for travelling the segment, or a lane for travelling the segment.

13. A system comprising:
a memory device; and
a processing device, coupled to the memory device, wherein the processing device is to:
identify, based on grade data of a route of an autonomous vehicle (AV), a segment of the route that has a grade value that meets a threshold grade value;
identifying map data of a road network associated with the route;
responsive to identifying the segment, generate, based on the grade data and physical vehicle data of the AV, driving constraint data for the segment of the route;
embedding the driving constraint data in the map data to generate map data embedded with the driving constraint data;
while the AV is travelling the segment of the route, identify current environmental sensor data for a portion of the segment of the route, the current environmental sensing data being associated with a position of one or more objects proximate the AV;
cause the AV to generate, based on the map data embedded with the driving constraint data for the segment of the route and current environmental sensing data associated with the portion of the segment of the route, short time horizon routing data corresponding to the portion of the segment; and
cause the AV to travel the portion of the segment of the route based on the short time horizon routing data.

14. The system of claim 13, wherein:
the grade value comprises a steepness value and a length value for the segment; and
the threshold grade value comprises a threshold steepness value and a threshold length value.

15. The system of claim 14, wherein the threshold steepness value is a threshold downhill steepness value, wherein the driving constraint data comprises a type of braking for the segment, wherein the AV is to travel the portion of the segment using the type of braking, and wherein the type of braking comprises one or more of regenerative braking, friction braking, engine braking, downshifting, exhaust braking, or using drive line retarders.

16. The system of claim 14, wherein the threshold steepness value is a threshold uphill steepness value, wherein the driving constraint data comprises a calculated maximum speed for the segment based on physical limitations of the AV, the calculated maximum speed being less than a corresponding maximum regulatory speed, and wherein the AV is to travel the portion of the segment based on the calculated maximum speed.

17. A non-transitory computer-readable storage medium having instructions stored thereon that, when executed by a processing device, cause the processing device to:
identify, based on grade data of a route of an autonomous vehicle (AV), a segment of the route that has a grade value that meets a threshold grade value;
identify map data of a road network associated with the route;
responsive to identifying the segment, generate, based on the grade data and physical vehicle data of the AV, driving constraint data for the segment of the route;
embed the driving constraint data in the map data to generate map data embedded with the driving constraint data;
while the AV is travelling the segment of the route, identify current environmental sensing data for a portion of the segment of the route, the current environmental sensing data being associated with a position of one or more objects proximate the AV;
cause the AV to generate, based on the map data embedded with the driving constraint data for the segment of the route and current environmental sensing data associated with the portion of the segment of the route, short time horizon routing data corresponding to the portion of the segment; and
causing the AV to travel the portion of the segment of the route based on the short time horizon routing data.

18. The non-transitory computer-readable storage medium of claim 17, wherein:
the grade value comprises a steepness value and a length value for the segment; and
the threshold grade value comprises a threshold steepness value and a threshold length value.

19. The non-transitory computer-readable storage medium of claim 18, wherein the threshold steepness value is a threshold downhill steepness value, wherein the driving constraint data comprises a type of braking for the segment, wherein the AV is to travel the portion of the segment using the type of braking, and wherein the type of braking comprises one or more of regenerative braking, friction braking, engine braking, downshifting, exhaust braking, or using drive line retarders.

20. The non-transitory computer-readable storage medium of claim 18, wherein the threshold steepness value is a threshold uphill steepness value, wherein the driving constraint data comprises a calculated maximum speed for the segment based on physical limitations of the AV, the calculated maximum speed being less than a corresponding maximum regulatory speed, and wherein the AV is to travel the portion of the segment based on the calculated maximum speed.

* * * * *